April 28, 1959 R. W. EMERY ET AL 2,884,546

ELECTRONIC SINGLE POLE MULTI-THROW SWITCH

Filed Aug. 17, 1955 2 Sheets-Sheet 1

INVENTORS
RAYMOND W. EMERY
ROBERT A. HENLE
JOSEPH C. LOGUE
BY Alvin J. Riddles
AGENT

ELECTRONIC SINGLE POLE MULTI-THROW SWITCH

Filed Aug. 17, 1955 2 Sheets-Sheet 2

*INVENTORS*
RAYMOND W. EMERY
ROBERT A. HENLE
*BY* JOSEPH C. LOGUE
Alvin J. Riddles
AGENT United States Patent Office 2,884,546

Patented Apr. 28, 1959

2,884,546

ELECTRONIC SINGLE POLE MULTI-THROW SWITCH

Raymond W. Emery, Poughkeepsie, Robert A. Henle, Hyde Park, and Joseph C. Logue, Poughkeepsie, N.Y., assignors to International Business Machines Corporation, New York, N.Y., a corporation of New York Application August 17, 1955, Serial No. 528,932

2 Claims. (Cl. 307—88.5)

This invention relates to an electronic circuit capable of performance as a single polt multi-throw switch.

Circuits of this type are capable of providing, when an appropriate input signal is applied, either a selected one of a multiplicity of separate signals on a single output line or a signal on a selected one of several output lines. Such switching circuits, in effect, perform electronically, operations that heretofore have been electromechanical, with a resulting absence of moving parts, an increase in operating speed and an increase in reliability.

Accordingly, it is an object of this invention to provide an electronic circuit capable of providing a selected one of a multiplicity of output signals when an appropriate input signal is applied.

Another object of this invention is to provide an electronic circuit capable of providing a signal at any one of a multiplicity of output terminals when an appropriate input signal is applied.

Still another object is to provide an electronic circuit capable of establishing a predetermined output level when an input signal within a selected range is applied.

Other objects of the invention will be pointed out in the following description and claims and illustrated in the accompanying drawings, which disclose, by way of example, the principle of the invention and the best mode, which has been contemplated, of applying that principle.

Briefly these objects are achieved by providing in an electronic circuit a source of variable current, connected to a step function type of load impedance. This source of variable current can comprise a current generator or a control source applied through a translating element such as a transistor or an electron tube. With this circuit it is possible to introduce or sense signals at selected points in this load impedance by delivering an appropriate input current to the step function load impedance.

Figure 1:
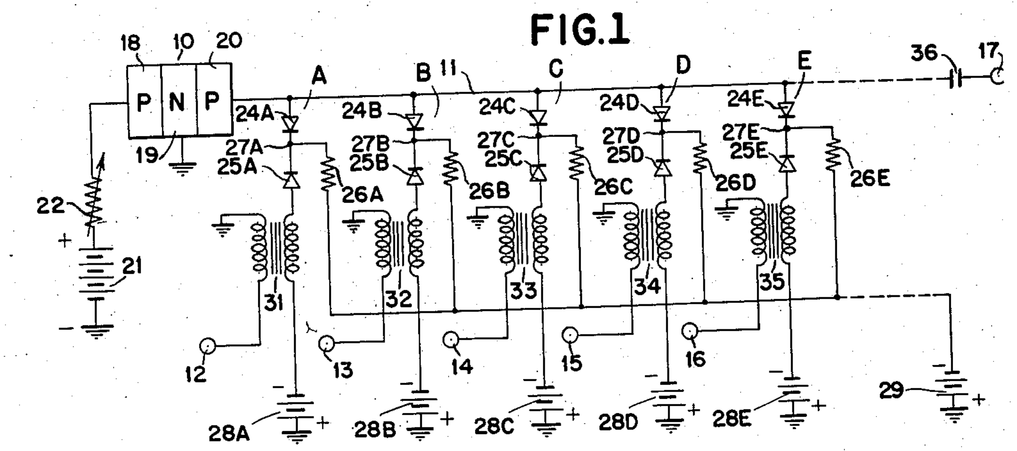
Figure 1 is a diagram of a single pole multi-throw electronic switch employing a transistor as translating element.

Referring now to Figure 1 there is shown an electronic circuit capable of functioning as a single pole multi-throw switch circuit wherein a translating element shown as a PNP junction transistor 10 is connected to a step function load network indicated generally as 11 and input means shown as terminals 12, 13, 14, 15 and 16 is provided to introduce alternating current input signals. Selection of a desired input signal to appear at output terminal 17 is accomplished by variation of the current through transistor 10. An analysis of the step function load impedance appears in copending application Serial No. 479,413, filed January 3, 1955.

It should be noted that the selection of the PNP junction transistor as a translating element is done for illustration only and that other types of devices including electron tubes, and semiconductor elements employing both junctions and point contacts may be employed as translating elements with proper circuit adjustments such as could be performed by one skilled in the art. The only requirement for the satisfactory operation of a semi-conductor element or an electron tube as a translating device in this circuit being that the device exhibit no negative resistance in the output characteristic within the region of proposed operation and that the output characteristic have a fairly flat region for a given value of input signal. Such flat output characteristics for electron tubes are commonly referred to in the art as "pentode type characteristics" although other tubes than pentodes may exhibit these characteristics.

The transistor 10 has an emitter 18, a base 19 and a collector 20. The transistor 10 operates with the base 19 connected to ground. Provision is made to introduce selected magnitudes of emitter current to the transistor 10 and this provision is shown schematically in this circuit as a variable current source comprising battery 21, and variable resistor 22 connected to supply positive current to emitter 18. Other techniques of providing selected emitter current values such as through the use of a gated pulse source could be substituted by one skilled in the art for the variable current source shown. The collector 20 of transistor 10 is connected to the step function load network 11 which is shown having branches A, B, C, D and E. Each branch functions to provide a step in the magnitude of the total load and, taking branch A as an example, is made up of a first diode 24A, a second diode 25A and an impedance 26A connected to a point 27A between them. The diode 24A is connected with its cathode at point 27A and its anode connected to collector 20 so that it is connected in the direction of easy current flow from collector 20 to point 27A. The diode 25A is connected with its cathode at point 27A and its anode at a source of negative biasing potential shown as battery 28A, through the secondary winding of signal introduction transformer 31 to be later described. The impedance of the secondary winding of transformer 31 is assumed to be negligible. The resistor 26A is connected between point 27A and a source of negative power for the circuit shown as battery 29. Five load branches A, B, C, D and E are connected in parallel as described above for branch A. Each load branch is connected to a specific negative biasing level for that particular branch shown as batteries 28A through 28E, these levels being progressive in value from branch to branch the largest negative biasing level being at a value less than the level of the source of negative collector power 29. The biasing potentials being taken for example so that branch A is the most negative and the remaining branches B, C, D and E being progressively less negative.

While five branches have been shown this is done for illustration only as it will be clear from the above circuit description and the following operation description that it is possible to construct the type of circuit of this invention to provide as many load steps as are desired.

Provision is made for introducing a plurality of alternating current signals into the circuit in series with the individual branch biasing potentials. This is shown as input terminals 12 through 16 connected each through transformers 31, 32, 33, 34 and 35, although other methods of isolated signal introduction such as cathode followers could be devised. A decoupling capacitor 36 is provided to isolate output terminal 17 from the D.C. collector level so that only the A.C. input signal selected appears at the terminal.

Referring now to Figure 1, the operation of the step function load is as follows: Since resistors 26A through 26E are connected to a negative potential level 29 having a magnitude greater than any of the progressive potential sources 28A through 28E, current flows in each branch taking branch A as an example, from one value of negative potential at 28A through diode 25A and resistor 26A to a greater value of negative potential 29. With these currents flowing points 27A through 27E are at a value of potential substantially equivalent to the respective values of negative potential of batteries 28A through 28E assuming the forward resistance through diodes 25A through 25E to be negligible.

In the no emitter current condition the potential of collector 20 is the negative potential of point 27A because diodes 24A through 24E are connected in proper polarity to permit collector 20 to seek the level of the most negative point which has been set up at point 27A.

In this condition the anodes of all diodes 24B through 24E are negative with respect to their cathodes and hence these diodes are reverse biased. As the emitter current is introduced, current begins to flow in the collector circuit and the flow of current in the collector circuit raises the potential of the collector 20 because of the voltage drop across resistor 26A. This rise in potential cuts off diode 25A. Thus, as the emitter current increases, which may be produced by varying the value of resistor 22, the potential level of the collector 20 becomes more positive. This rise is linear until the collector potential becomes more positive than the next negative individual biasing potential 28B. In Figure 1, branch B has the next most negative biasing potential and when the collector potential becomes positive with respect to this biasing potential which as described above appears at point 27B then the anode of diode 24B is positive with respect to the cathode and current can now flow from collector 20 through diode 24B and resistor 26B to battery 29. This in effect switches resistor 26B into the load in parallel with resistor 26A. In a small collector voltage region diodes 24B and 25B are both conducting in their forward direction. This greatly reduces the effective load impedance and therefore increases in emitter current result in very small increases in collector voltage. The transistor operates in this region until the collector current is increased to the point where the voltage drop across resistors 26A and 26B in parallel raises the collector potential above that of battery 28B. Diode 25B then becomes reverse biased and further increases in emitter current will once again result in linear collector current increases until the collector 20 reaches a value equal to the next higher branch potential level which is the potential level at point 27C. At this point diode 24C is no longer cut off, resistor 26C is effectively switched in parallel with the load and increasing the collector current raises the potential level of point 27C and cuts off diode 25C. This type of operation takes place for each branch when the potential of collector 20 reaches the value of the individual negative biasing potential of the branch.

Figure 2:
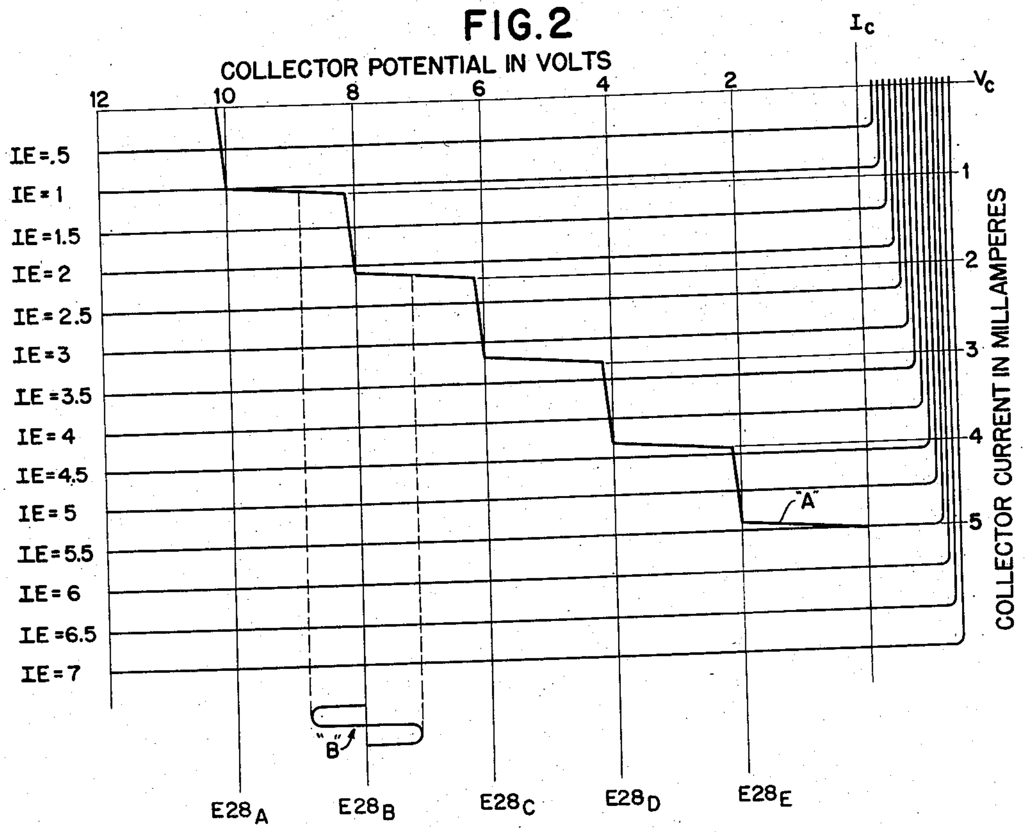
Figure 2 is a collector volt ampere characteristic of the transistor of Figure 1.

The performance of the step function load impedance in the circuit of Figure 1 is illustrated graphically in Figure 2 which is the collector volt ampere characteristic of transistor 10. Progressively switching of impedances in parallel with the load produces a stepped load line, labelled "A," with the steps occurring at values of collector potential corresponding to the individual negative branch biasing potentials. These values are shown as dotted lines labelled $E28_A$ through $E28_E$.

Referring now to both Figures 1 and 2, in the zero emitter current condition with essentially no current flowing in the collector circuit, the load line "A" is shown as crossing the $V_c$ axis at the potential of the battery 28A plus the forward voltage drop across diode 25A. As emitter current is introduced, current flows in the collector circuit for the magnitude of the collector circuit impedance as represented by resistor 26A, from here the slope of the load line is constant with collector current increases until the voltage drop across resistor 26A brings collector 20 to a potential level equal to point 27B. This potential level is shown in Figure 2 as $E28_B$ plus the forward voltage drop across diode 25B. At this point diode 24B is no longer cut off and resistor 26B is switched into the load in parallel with resistor 26A. Theoretically the slope of the load line "A" in this region would be infinite, however, as a practical consideration, the diodes 24A through 24E are known to have a small forward impedance and for this reason a slight slope is given to the load line "A" in each step. In this region, as the collector current increases, 27B moves more positive than battery 28B and cuts off diode 25B. The slope of the load line "A" is once again linear until the voltage drop across resistors 26A and 26B in parallel raises the level of collector 20 to the potential at point 27C. This is indicated in Figure 2 as $E28_C$. At this point resistor 26C is placed in parallel with resistors 26A and 26B effectively cutting the load impedance and producing a step in the load line "A." This type of operation continues generating as many load line steps as the designer has occasion to build into the circuit.

The circuit of Figure 1 will perform as an electronic single pole multi-throw switch when A.C. signals are introduced on input terminals 12 through 16 so that by introducing a value of emitter current sufficient to operate on a particular step of the load line it is possible to have the A.C. signal, introduced at the load branch for that step, appear at the output terminal. Each A.C. signal is introduced into its respective branch of the load in series with the D.C. biasing potential of that branch so that the effect of the signal is to move the vertical portion of the step in the load line "A" of Figure 2 through a range equivalent to the magnitude of the A.C. signal. This may be seen by referring to Figure 2 wherein an A.C. signal labelled "B" of approximately 2 volts peak to peak is shown impressed in series with $E28_B$ as would be accomplished by introducing a 2 volt peak to peak signal at terminal 13 of Figure 1. Assuming a value of emitter current sufficient to operate on the step of the load "A" of Figure 2 which is approximately the range of 1 to 2 milliamperes, the swing of the low impedance region of the circuit due to the impressed signal "B" causes the collector potential to swing through a value approximately equivalent to "B." This collector swing is available at terminal 17.

From this description it may be seen that by introducing a value of emitter current within a range sufficient to operate the circuit of Figure 1 on a particular step of the load line an A.C. signal introduced into the load at the branch representing the step can be selected to appear at the output. With A.C. signals introduced at each branch, only the signal at the branch corresponding to the step of the load line selected for operation will appear on the output because all branch diodes labelled 25A through 25E below the operating point are cut off and all signals introduced into the load at steps having higher collector current cannot appear on the output because all branch diodes labelled 24A through 24E above the operating point are still cut off.

At this point it should be noted that the circuit of Figure 1 will deliver a predetermined output level whenever an input signal within a given range is applied. This takes place because once the collector potential reaches a value such that the diode between the resistor of a particular branch and the collector of the transistor is no longer cut off the circuit is in a low impedance region until sufficient current is flowing in the collector circuit to compensate for the decreased impedance of the load. Hence, all values of emitter current covered by the low impedance region will result in only one value of output voltage. This may be seen by referring to Figure 2, taking the step in the load line due to branch B as an example, values of emitter current from 1 through 2 milliamperes produce essentially the same output voltage level of 8 volts. Thus with this circuit a selected output signal level is available for a given range of input signals.

The single pole multi-throw switch can be modified to deliver a signal to a selected one of a plurality of output terminals by adding resistance in series with the branch diodes of the step function load impedance to decrease the slope of the steeper portions of the load line and using this load line as a transfer characteristic. In this embodiment a translating device is coupled to a step function load impedance as in the previously described embodiment, however, here, an A.C. input signal impressed on the input or output of the translating device may be directed to appear at one of several output terminals each associated with a particular branch of the load impedance by variation of the input current magnitude through the translating device.

Figure 3:
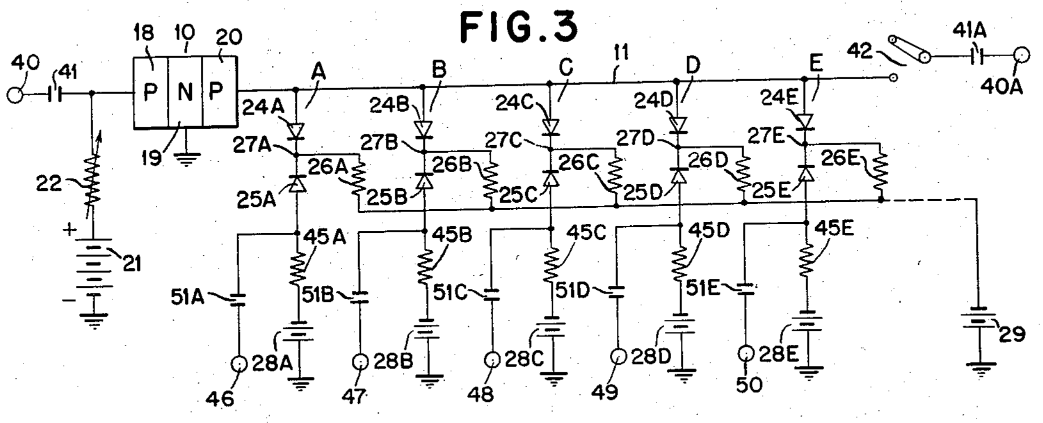
Figure 3 is a diagram of another type of single pole multi-throw switch employing a transistor as a translating element.

This embodiment is shown in Figure 3 wherein like reference numerals are used to designate circuitry common to both embodiments. In Figure 3 is shown the PNP transistor 10 operating as the translating device. Provision is made for introducing a desired magnitude of emitter current comprising the circuit from battery 21 through resistors 22. An input terminal 40 and decoupling capacitor 41 are provided to permit introduction of an A.C. input signal in series with the emitter current. Alternate input terminal 40A and decoupling capacitor 41A are also shown connectable to collector 20 through switch 42. The step function load is shown generally as 11 comprising branches A, B, C, D and E. This number being merely taken as an example since as previously described there is no theoretical limit to the number of steps making up the load. Each branch comprises taking, branch A as an example, a first diode 24A, a second diode 25A, a first resistor 45A, a second resistor 26A and a source of biasing potential shown as battery 28A. The first diode 24A is connected with its cathode at point 27A between the first and second diodes and with its anode connected to the collector 20. The second diode 25A is connected with its cathode at point 27A and its anode connected to the negative terminal of battery 28A through first resistor 45A. The second resistor 26A is connected between point 27A and a source of negative potential shown as battery 29. The magnitudes of the individual biasing potentials are so selected that the values are progressive from step to step with the greatest value being less than battery 29. In the circuit of Figure 3, battery 28A is assumed to have the greatest negative branch biasing potential and battery 28E the least. Under these conditions current flows in branch A from battery 28 through resistor 45A, diode 25A and resistor 26A to the more negative potential value of battery 29 so that point 27A is at a value of potential between the values of batteries 28A and 29 that is more negative than battery 28A but less negative than battery 29. Each of the five branches A, B, C, D ond E are shown connected as described above for branch A and, as described in connection with Figure 1, each branch is operable to switch its respective branch load resistor into the load when the collector potential reaches a selected value. The operation of the circuit of Figure 3 is the same as in Figure 1 with the exception that the resistors 45A through 45E serve to increase the required potential rise at points 27A through 27E in order to cut off diodes 25A through 25E so that once, taking branch A as an example, diode 24A is no longer cut off and resistor 26A is switched into the load, then, as a result of the presence of resistor 45A a much larger potential rise at point 27A is required to cut off diode 25A.

Figure 4:
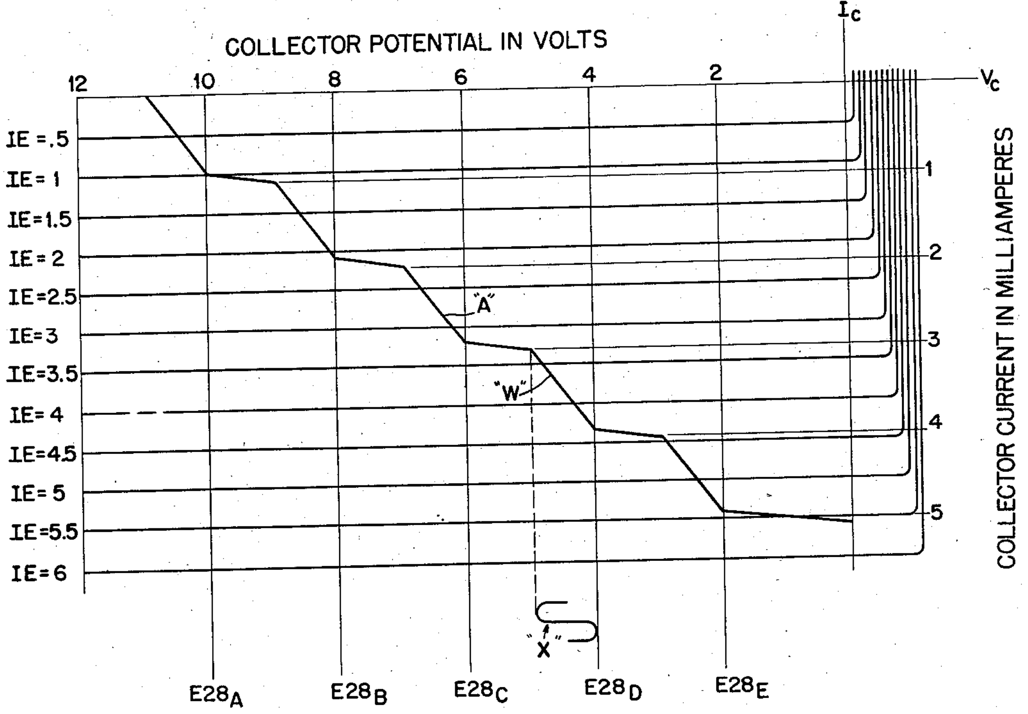
Figure 4 is the collector volt ampere characteristic of the circuit of Figure 3.

The effect of this addition of resistance in each branch circuit may be observed graphically by referring to Figure 4 which shows the volt-ampere characteristic of the transistor connected as shown in Figure 3. In Figure 4 the load line labelled A is shown crossing the $V_c$ axis at the point corresponding to the potential value of point

27A which as previously described is assumed to be the most negative branch. As the collector potential increases the load line follows a slope determined by the impedance of resistors 45A and 26A in parallel until the potential at point 27A reaches a point equal to the value of battery 28A. At this point diode 25A is cut off and the load impedance increases sharply when resistor 45A is effectively taken out of parallel with resistor 26A. This change in load impedance decreases the slope of the load line A and the load line follows the new slope until the potiential of point 27B is reached. At this point diode 24B is no longer cut off and resistor 26B is switched in parallel with resistor 26A, changing the load impedance and the slope of the load line. Further increases in collector current result in the collector 20 and point 27B becoming less negative until point 27B reaches the potential value of battery 28B at which point diode 25B is cut off and the current through resistor 45B is cut off. This point is labelled in Figure 2 as $E28_B$. Further increases in collector current result in subsequent steps in the load line as each branch of the load becomes effective. The point at which the load line changes slope between the biasing potential values is controllable by selection of the value of resistors 45A through 45E.

The circuit of Figure 3 can be made to perform as a single pole multi-throw switch by introducing an A.C. signal at either terminal 40 or terminal 40A capable of producing a collector potential swing no greater than the difference between the individual branch biasing potentials and by providing output terminals at each of the load branches.

Referring now to Figures 3 and 4 assuming an A.C. signal of magnitude 1 volt from peak to peak impressed on the collector or by means of the emitter on the collector of transistor 10 this A.C. signal can be made to appear at a selected one of output terminals 46 through 50 by adjustment of the emitter current through transistor 10 to cause the circuit to operate at a point influenced by the particular branch of the load associated with the selected output terminal. Taking as an illustrative example the selection of terminal 49 as the desired output terminal, the emitter current is adjusted to the range from 3.25 to 4 milliamperes as by adjusting resistor 22. With this emitter current, the circuit, as graphically represented in Figure 2, operates on the region of the load line labelled "W" and the input signal labelled "X" results in an output current swing of approximately 0.75 milliampere and an output voltage swing of 1 volt. The A.C. signal cannot appear at terminals 46, 47, and 48 because diodes 25A, 25B and 25C are cut off and similarly it cannot appear at terminal 50 because diode 24E is cut off.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. For example, it should be noted at this point that diode 24A does not perform any function in the circuit operation since the point at which it would affect the load line is beyond the $V_c$ axis. Similarly, diode 25E performs an essential function only if the last step of the load line is desired to be the same as the previous steps. Hence, diode 24A, the diode connecting the most heavily biased branch to the output of the translating device, is included only to show interchangeability between branches and it is not essential that this connection be asymmetric. Diode 25E can be eliminated if the load line can end in the low impedance region.

Also the term A.C. is contemplated to be any time varying fluctuation of current and voltage such as pulses. It is the intention therefore, to be limited only as indicated by the scope of the following claims. What is claimed is:

1. An electronic circuit comprising in combination a PNP type junction transistor including emitter base and collector electrodes having said base electrode connected to reference potential, a source of collector bias having one terminal connected to reference potential, a step function load impedance including at least one load branch each branch comprising a first diode having its cathode connected to said collector electrode, a branch load resistor, the anode of said first diode being connected to a first terminal of said branch load resistor, the second terminal of said branch load resistor being connected to the remaining terminal of said source of collector bias, a second diode having its anode connected to the anode of said first diode, a source of branch biasing potential of the same polarity and having a magnitude less than said source of collector bias and being progressive in magnitude from branch to branch, the cathode of said second diode being connected to one terminal of said branch biasing potential source, the remaining terminal of said branch biasing potential source being connected to reference potential, selection means for supplying variable current to said emitter connection, alternating current signal handling means connected to each said branch of said step function load impedance and alternating current signal handling means connected to said collector connection.

2. An electronic circuit comprising, in combination, a junction transistor of a particular conductivity type including at least emitter, base and collector electrodes and having said base electrode connected to a reference potential, a source of collector bias having one terminal connected to said reference potential, a step function load impedance including at least one load branch, each branch comprising a first diode having an appropriate one of the terminals thereof determined by the conductivity type of said transistor connected to said collector electrode, a branch load resistor, the remaining terminal of said first diode being connected to a first terminal of said branch load resistor, the second terminal of said branch load resistor being connected to the remaining terminal of said source of collector bias, a second diode having the same terminal as said remaining terminal of said first diode connected to said remaining terminal of said first diode, a source of branch biasing potential of the same polarity and having a magnitude less than said source of collector bias and being progressive in magnitude from branch to branch, the remaining terminal of said second diode being connected to one terminal of said branch biasing potential source, the remaining terminal of said branch biasing potential source being connected to reference potential, selection means for supplying variable current to said emitter connection, alternating current signal handling means connected to each said branch of said step function load impedance and alternating current signal handling means connected to said collector connection.

References Cited in the file of this patent

UNITED STATES PATENTS

| | | |
|---|---|---|
| 1,956,397 | Nicolson | Apr. 24, 1934 |
| 2,535,303 | Lewis | Dec. 26, 1950 |
| 2,602,918 | Kretzmer | July 8, 1952 |
| 2,609,459 | Bergson | Sept. 2, 1952 |
| 2,616,960 | Dell et al. | Nov. 4, 1952 |
| 2,745,956 | Baker | May 15, 1956 |

OTHER REFERENCES

Publication: Transistors Theory and Practice, by Turner, page 28, published by Gernsback Pub., Inc.; copyright April 2, 1954.